ERROR CORRECTOR UTILIZING CHARACTER AVERAGE VALUE

Filed Nov. 13, 1961 4 Sheets-Sheet 1

INVENTOR
VERL L. TAYLOR
BY Moody and Phillips
ATTORNEYS

INVENTOR
VERL L. TAYLOR
BY Moody and Phillips
ATTORNEYS

ERROR CORRECTOR UTILIZING CHARACTER AVERAGE VALUE

Filed Nov. 13, 1961 4 Sheets-Sheet 3

INVENTOR
VERL L. TAYLOR
BY Moody and Phillion
ATTORNEYS

March 9, 1965 V. L. TAYLOR 3,173,125

ERROR CORRECTOR UTILIZING CHARACTER AVERAGE VALUE

Filed Nov. 13, 1961 4 Sheets-Sheet 4

INVENTOR
VERL L. TAYLOR
BY Woodz and Phillips
ATTORNEYS

United States Patent Office 3,173,125

Patented Mar. 9, 1965

3,173,125

ERROR CORRECTOR UTILIZING CHARACTER AVERAGE VALUE

Verl L. Taylor, Burbank, Calif., assignor to Collins Radio Company, Cedar Rapids, Iowa, a corporation of Iowa Filed Nov. 13, 1961, Ser. No. 151,603
5 Claims. (Cl. 340—146.1)

This invention relates generally to error detecting and correcting means for coded information and, more specifically, it relates to an error detecting and correcting means for received coded information whose operation is based on the probability that when a group of bits contains an erroneous bit, the said erroneous bit will be the bit having characteristics farthest from the normal characteristics of a bit.

In the transmission of binary information, which is comprised ordinarily of what is commonly known as spaces or marks, it sometimes occurs that a space or a mark bit is distorted so that it appears to represent the other type of information. For example, a space may be distorted in transmission so as to appear to be a mark and, similarly, a mark may be distorted so as to appear to be a space bit. One of the most common means of detecting errors of this nature is by means of what is known as the parity method. The parity method, essentially, is a method whereby an additional bit is transmitted along with the information-bearing bits and is made to be either a mark or a space depending upon the number of marks in the information portion of the code. For example, if the code consists of 5 bits the parity bit, which would be the sixth bit, would always be such that the total number of marks would be an even number. Thus, if a particular five-bit code contained 3 marks, the parity bit would also be a mark so that the total number of marks would be 4. Thus, any time that the total number of marks in the received code was an odd number, the receiver would recognize that at least one error existed in the code.

Other means have been provided to ascertain which of the particular bits of the five bits in a given code is in error and then to correct the error. However, this correction of a detected error usually necessitates the transmission of additional bits over and beyond the five information-carrying bits and the parity bit. Such additional error-correcting bits involve considerable additional circuitry in a transmitter and also considerable additional circuitry in the receiver, as well as requiring additional time for transmitting purposes. It might be noted that circuitry has been developed for detecting and correcting two errors. The circuitry required to detect and correct two errors is, of course, considerably more complicated than that required to detect and correct a single error. However, even in the case of the detection and correction of a single error considerably additional circuitry in prior art structures is required. It might also be noted that the probability of two errors occurring in a single code is very much less than the probability of a single error occurring. Consequently, even in a high fidelity data transmission system, it does not at the present time seem necessary to employ circuitry capable of detecting and correcting a double error.

In most data transmission systems that are employed to transmit marks and spaces, the total amount of energy contained in a mark or a space should be equal. If a signal contains noise then the quantity of energy in a given mark or space can be changed substantially by said noise. It has been established that there is a rather high probability that if a given code contains an error, that error will be in the mark or the shape in which the total energy has the largest deviation from the average energy of the five total bits forming the code. The aforementioned probability is great enough so that an error detecting and correcting mechanism can be based thereon to produce suitable results in present high quality data transmission systems.

An object of the invention, then, is to provide a single error detecting and correcting means based on the deviation of the energy contained in specific bits of a code from the average energy of the bits of a given code.

Another object of the invention is a relatively simple and inexpensive single error detecting and correcting circuit which will produce highly satisfactory results for high quality present-day data transmission systems.

A third purpose of the invention is a single error detecting and correcting circuit means whereby no additional bits are required to be transmitted in excess of the information-carrying, or the data-carrying bits, and a parity bit.

A fourth object of the invention is the improvement of single error detecting and correcting circuit means, generally.

In accordance with the invention, the six bits contained in a given code are first changed from a serial state to a parallel state by means of a storage unit which is comprised of six individual storage units, each of which stores a quantity of energy in accordance with the quantity of energy contained in each of the six bits of the code. A timing pulse discharges the energy in each of the six storage units simultaneously to a comparison unit and also to an averager unit. The averager unit means functions to find the average amplitude of the pulses supplied from the storage units and to produce an output pulse having this average amplitude. Such average amplitude pulse is supplied to the comparison units wherein each of the six pulses from the storage units is compared with the average amplitude pulse. The comparison unit functions to produce six output pulses, which respectively have amplitudes equal to the difference of the average amplitude pulse and the six pulses supplied from the storage units. The six difference pulses are rectified so that they all have the same polarity.

The six difference amplitude pulses from the rectifiers are then supplied to two parallel paths. The first of these paths leads to an amplitude-to-width converter, which converts the rectified pulses into pulses whose width is proportional to the amplitude of the supplied pulse. The second path leads to the largest amplitude gate which selects the largest difference amplitude pulse and converts it to a pulse whose width is proportional to the amplitude of the applied pulse. This last-mentioned pulse is then compared simultaneously with the six pulses from the amplitude-to-width converter in a comparison circuit which functions to pass only the widest pulse of the six pulses from the amplitude-to-width converter. In other words, there has now been produced at the output of the comparison circuit an output pulse in only one of the six channels, said output pulse indicating that this particular channel contains the bit whose amplitude deviated the greatest amount from the average amplitudes of the six applied input pulses.

In another circuit the received code has been examined to determine if an error does exist in the code. Such error detecting means is determined by the use of a parity bit as discussed hereinbefore. If such error is indicated an output signal is provided to a gating means to which the individual outputs of the last-mentioned comparison circuit are connected. The output terminals of the gating means, which consist of six individual outputs, are individually connected to a second storage means in which the received code has been stored. In the event that an error was indicated, the gating means is caused to be opened so that the single pulse appearing on one of the six channels at the output of the last-mentioned comparison circuit will pass through to the second storage means and alter the bit appearing in the corresponding channel, which bit is the bit whose total energy content deviated the greatest from the average energy of the six bits of the code.

The above-mentioned and other objects and features of the invention will be more fully understood from the following detailed description thereof when read in conjunction with the drawings in which.

Figure 12:
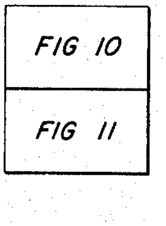
Figure 10:
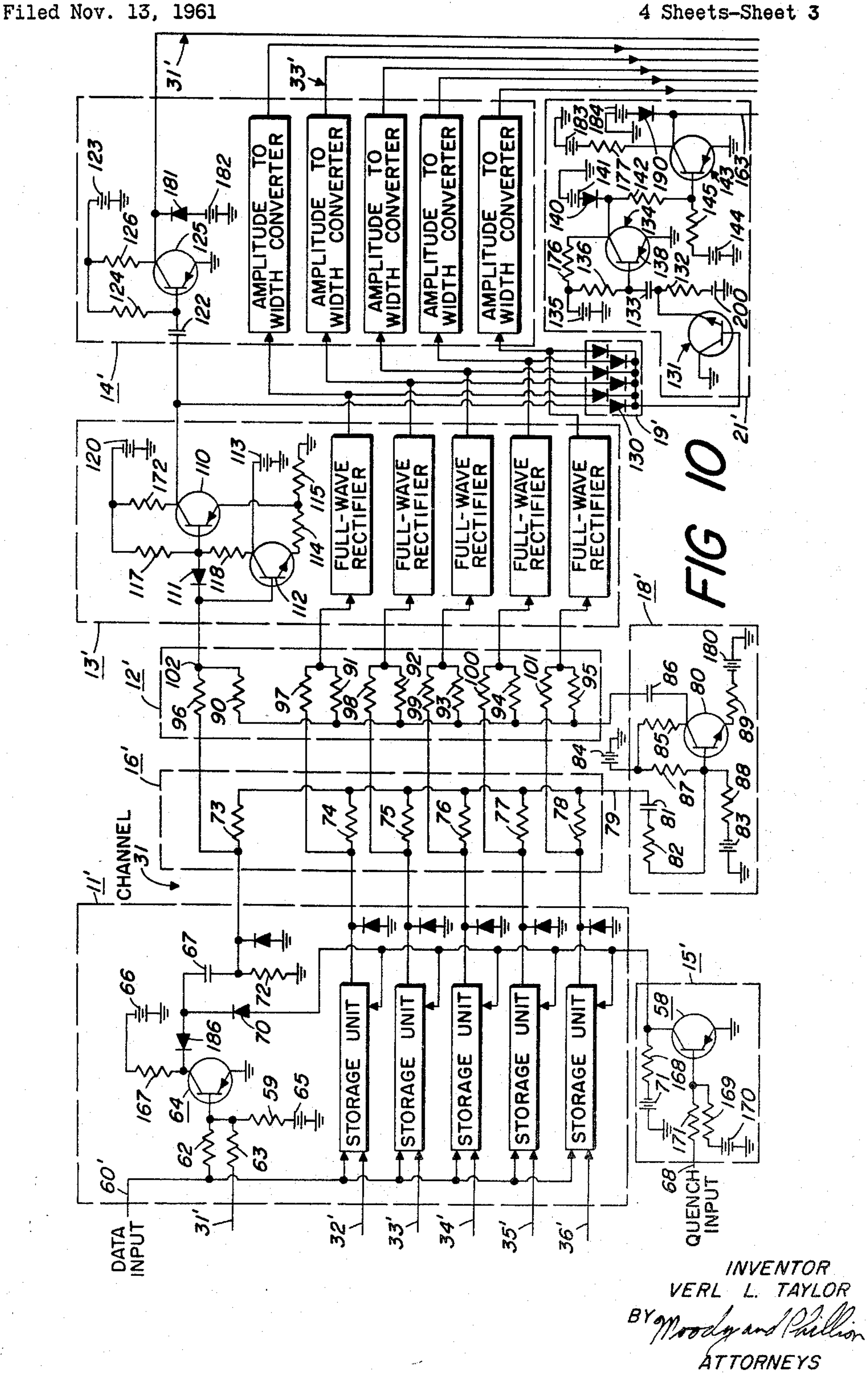
Figure 11:
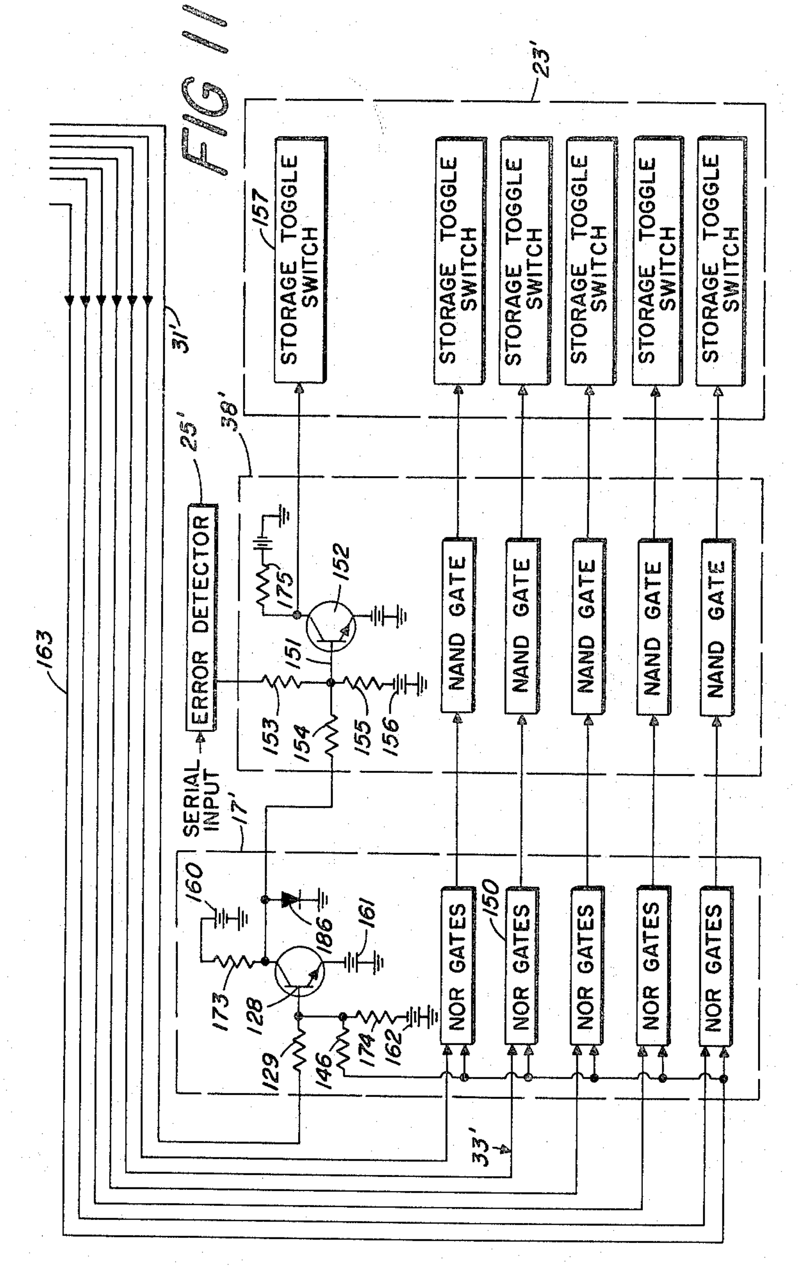

FIGS. 10 and 11 join together and constitute a combination block and schematic diagram of the invention; and FIG. 12 shows how FIGS. 10 and 11 go together.

Figure 1:
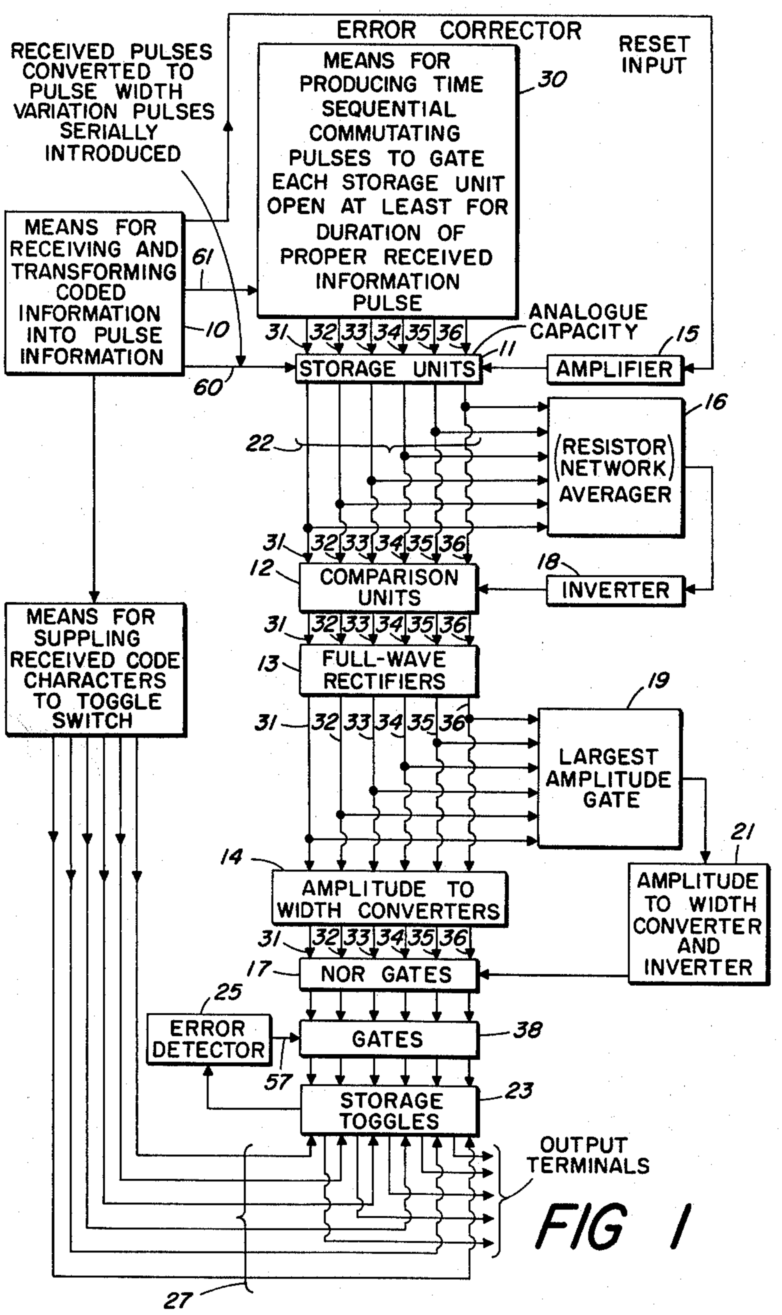
FIG. 1 is a block diagram of the invention.

Referring now to FIG. 1, there is shown a block diagram of the invention. The coded information is received by the receiver 10 and supplied to the storage units 11 as pulse width information, each pulse having a constant amplitude. The storage unit 11 functions to store the energy of each pulse width bit, the amount of said energy being proportional to the width of the pulse. It should be noted that the information received by the receiver 10 can be any one of a number of different forms. For example, it could be a binary code represented by pulse phased signals or it could be binary information represented by shifting the frequency for marks and spaces. The latter method of data transmission is known as frequency shift keying (FSK). Other methods of representing binary information could also be employed. Whatever means of encoding are employed, however, the receiver 10 functions to transform the received information into pulse width data which is supplied serially to the storage units 11 in which there are six individual storage units, one for each of the six individual channels represented by the reference characters 31, 32, 33, 34, 35, and 36. It might be pointed out that six channels are employed since in a specific embodiment shown in FIG. 1, each code employs six bits; five bits of which carry the information and the sixth bit of which is a parity bit for error detecting purposes, as indicated hereinbefore.

In the storing of the serially introduced pulse width information into the storage units 11, the commutating circuits of block 30 function to serially cause each of the six storage units to accept one of the six bits of pulse width information being supplied thereto. Thus, it is necessary that the commutating pulses generated at the output terminals 31 through 36 of commutator 30 be synchronized with the individual bits of the serially introduced code being supplied to the storage units 11 from receiver 10. Various means for such synchronization are well known in the art and will not be discussed in detail. However, two possible means for providing such synchronization are, generally, a six stage decimal type ring counter, or a three stage binary counter constructed to have a count cycle of six and whose outputs are ANDED to produce a cyclical decimal count of six. The counting pulses to the counters can be supplied from the receiver 10 and specifically can be derived from the leading edges of the data pulses supplied to storage unit 11 from receiver 10.

It will be observed that six channels are used throughout most of the structure of FIG. 1. These six channels are individually labeled by reference characters 31 through 36 and identified collectively by the reference character 22. Each one of these channels carries one of the six bits of the code through the entire error corrector circuit. Thus, the bit appearing on channel 31 at the output of storage unit 11 is carried through the comparison unit 12, the full-wave rectifiers 13, the amplitude-to-width converters 14, the gates 17 and 38, and to the storage toggles 23.

Since there are six channels involved, many of the blocks will have six individual units therein, one for each channel. For example, as indicated above, the storage units 11 consists of six individual storage units, one for each of the six channels 31 through 36. Similarly, the comparison unit block 12, the full-wave rectifier block 13, the amplitude-to-width converter 14, the gate block 17, the gate block 38, and the storage toggles block 23 each contain six individual units of the type indicated in a block, one unit for each of the six channels. The averager 16 and the largest amplitude gate 19, each have the six channels as their input but have only a single output. The function of these two blocks is to facilitate a comparison function which will be described in more detail later.

Figure 2:
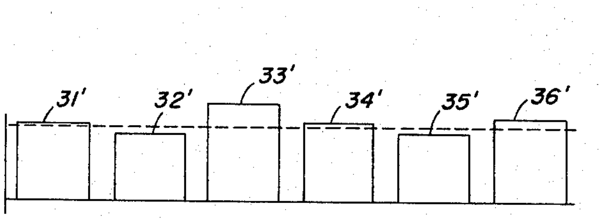
FIGS. 2 through 9 are voltage waveforms showing the signals appearing on the six channels of the circuit of FIG. 1 at various points in the circuit.

Assume now for purposes of discussion, that the energy stored in each of the storage units 11 will produce, when released by a reset pulse from amplifier 15, pulses on the individual channels 31 through 36, as shown in FIG. 2, wherein each pulse is labeled with the same reference character, although primed, as the channel on which it appears. Thus, pulse 31' appears on the channel 31 at the output of storage unit 11 when the energy in said storage unit is released. At this point it should be noted that the energy stored in the storage unit 11 is released for all six bits of a given code character simultaneously by means of a reset pulse supplied through amplifier 15 and originating in the receiver after the six bits of each pulse code have been entered in the storage units 11. The specific structure for creating such reset pulse is well known in the art and will not be described in detail herein. Generally, it could be a pulse in the nature of a synchronizing pulse which occurs after the reception of each six-bit code and the storage of such code in the storage unit 11.

It will be observed from the pulses shown in FIG. 2 that pulses 31' through 36' have different amplitudes. This is due to the fact that each of the six bits forming the code that was stored in the storage units 11 was derived from a pulse width bit of somewhat different width, thus resulting in different quantities of stored energy. As was discussed earlier, the function of the error corrector code shown in FIG. 1 is to select that bit whose total energy deviated the greatest amount from the average energy of the six received bits. In FIG. 2 the bit 33' has been drawn arbitrarily to have the largest deviation.

Figure 3:
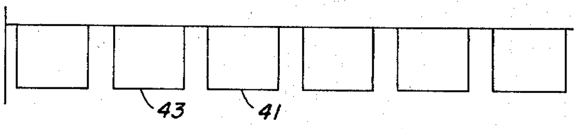
Figure 4:
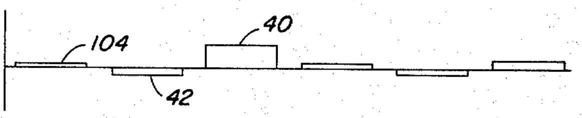

The six pulses shown in FIG. 2 are supplied to the comparison units of block 12 and also to the averager network 16. The function of the averager network is to find the average amplitude of the six pulses of FIG. 2. Such average amplitude pulse is then inverted in inverter 18 and supplied simultaneously to the six comparison units of block 12. Such inverted pulse is shown in FIG. 3. The reason why six pulses rather than one are shown in FIG. 3 is that the same inverted pulse is supplied to all of the six comparison units of block 12 and is compared individually with each of the pulses 31' through 36' of FIG. 2. In the comparison units 12, the amplitude difference between the pulses 31' to 36' of FIG. 2 and the inverted amplitude pulse of FIG. 3 is obtained for each of the six channels. Thus, there results a group of pulses from the output channels of the comparison units 12, as shown by FIG. 4 wherein, for example, the pulse 40 is equal to the difference in amplitude between the pulse 41 of FIG. 3 and the pulse 33' of FIG. 2. Similarly, the pulse 42 of FIG. 4 represents the difference between the pulse 43 of FIG. 3 and the pulse 32' of FIG. 2. However, since the pulses of FIG. 3 are being subtracted from the pulses of FIG. 2, the pulse 42 is negative whereas the pulse 40 is positive.

Figure 5:
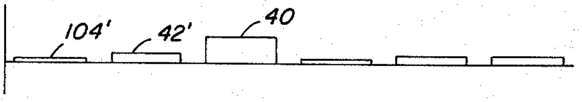

The difference pulses of FIG. 4 appearing on channels 31 through 36 at the output of comparison units 12 are then inverted to a positive state by the six full-wave rectifiers of block 13 to produce six pulses, as shown in FIG. 5. The six pulses of FIG. 5 are then supplied to the amplitude-to-width converters of block 14 wherein they are individually converted to pulses whose width is proportional to the amplitude of the applied pulse. Thus, the pulse 44 of FIG. 6 has a time width $t_1$ which is proportional to the amplitude of the pulse 42′ of FIG. 5. Similarly, the pulse 45 of FIG. 6 has a time width $t_2$ which is proportional to the amplitude of the pulse 40 of FIG. 4.

Figures 6, 7:
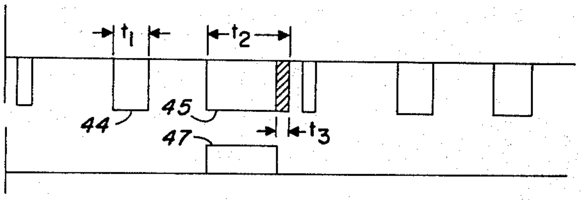
Figure 8:
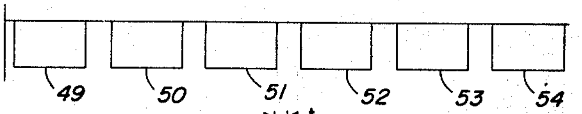

The six pulses appearing on the channels of the output of full-wave rectifier block 13 are also supplied to the largest amplitude gate 19 which functions to select that one of the six pulses whose amplitude is the greatest. In the specific code group shown in FIGS. 2 to 5 this particular bit is represented by the pulse 40 of FIG. 5. The largest amplitude gate 19 will then supply the pulse 40 to the amplitude-to-width converter 21 which will transform said pulse 40 into a pulse whose width is proportional to the amplitude of the applied pulse to produce a pulse 47, as shown in FIG. 7. This pulse 47 is then inverted in converter 21 and supplied simultaneously to each of the six "nor" gates of block 17. The waveform 8 shows six pulses which represent the single pulse supplied from the inverter 20 to the gate 17. In other words, all of the pulses shown as FIG. 8 are the same pulse simply applied to the six individual gates of block 17.

The "nor" gates 17 are constructed so that they are closed in response to a negative pulse from the inverter 20 and will pass a signal appearing on one of the channels 31 through 36 only in the absence of a pulse from the inverter 20. From an examination of FIGS. 6 and 8 it can be seen that the pulses 49, 50, 52, 53, and 54 from the inverter 20 function to block completely the pulses supplied to the gates in channels 31, 32, 34, 35, and 36. However, the pulse appearing on channel 33 from width converter 14 has a greater width than the pulse from inverter 20 by a time interval $t_3$. Consequently, there will be produced on the channel 33 at the output of "nor" gates 17 a pulse 55 having a time width $t_3$. It should perhaps be noted at this point that the amplitude-to-width converter 21 is constructed so that it will produce from the pulse 40 of FIG. 5 a pulse whose width is slightly less, by the amount of time $t_3$, than the width of the pulse produced by the amplitude-to-width converter 14 appearing in channel 33 from the pulse 40 of FIG. 5. Such difference in time width pulses must be done, of course, so that some output would appear on the channels at the output of gate 17. The pulse 55 appearing on channel 33 is then supplied to the "Nand" gates 38 which will be open only in the event of a signal appearing on the output lead 57 of error detector 25.

At this time a discussion of the error detector 25 and its function will be made. Generally speaking, the function of the error detector 25 is to determine if there is a single error in the code received. As discussed hereinbefore, this is done by use of the sixth bit, which is a parity bit. In the event that the total number of marks, including the parity bit in a given code, is not an even number, an error signal will appear on the output terminal 57 of the error detector 25. The specific circuitry of the error detector 25 is well known in the art and has been practiced for many years. Consequently, it will not be discussed in detail at this time. In the event that an erorr is present in the code the output pulse appearing on conductor 57 will open all of the gates of block 38. However, since a pulse appears only in channel 33, only the gate in that channel will pass a signal, namely the pulse 55. Such pulse 55 will be passed to the storage toggle through channel 33.

The storage toggle switches 23 are constructed to store the received code being checked. Such storage has been completed by the time the output pulse from gate 38 occurs. In the event that the error detector block 25 indicates an error the pulse 55 of FIG. 8 will pass through the gate 38 and switch the toggle switch in channel 33 to its opposite condition, i.e., changing the toggle switch from a space to a mark representation or from a mark to a space representation, thus correcting with a high probability of accuracy, the error in the code.

Referring now to FIG. 10, there is shown a combination schematic sketch and block diagram of the invention. The diagram of FIG. 10 is divided into sections outlined by dotted rectangles which correspond to the various blocks of FIG. 1, and are identified by the same reference character, although primed.

Since all of the six channels operate substantially the same throughout the entire circuit, the schematic diagram for only one channel has been shown. Such schematic diagram will now be discussed. The data input in pulse-width form is supplied to the circuit input lead 60, while the commutator inputs are supplied on input leads such as input lead 31′. It will be observed that the data input is common to all of the channels, whereas each channel has a separate commutator input. In the typical channel being discussed the commutator input and the data input are supplied across a pair of resistors 62 and 63, the common terminal of which is connected to the base of a transistor 64. Three conditions are possible; one is where there is data input, but no commutator input; the second is where there is a commutator input signal, but no data input signal; and the third is where there is concurrent data and commutator inputs. The circuit is designed so that in the absence of both the data input signal and the commutator input signal, the leads 60′ and 31′, respectively, would both be at minus 6 volts, and in the presence of either a data input or a commutator input signal the lead 60′ or the lead 31′ would be, respectively, at 0 volt. In the presence of both data and commutator input signals, both the leads 60′ and 31′ will be at 0 volt. Owing to the values of resistors 62, 63, and 59 and the positive biasing battery source 65, the transistor 64 will be conductive under all circumstances, except during the concurrent presence of a data input signal and a commutator input signal, at which time the base of transistor 64 will be slightly positive due to the action of the positive voltage source 65 and the fact that both leads 60 and 61 are at 0 volt. During the time that transistor 64 is conductive the collector thereof will be near ground potential. However, when concurrent data and commutator input signals are applied and the transistor is in an "off" condition, the collector electrode will begin to move toward the value of negative battery source 66, which in the particular embodiment of the invention being described is a negative 15 volts. Specifically, the decrease in collector electrode potential is accomplished by the charging of the upper plate of capacitor 67. The diode 186 prevents discharge of capacitor 67 back through the charging circuit. The amount of negative charge the capacitor 67 accumulates depends upon the width of the data input pulse. It should, perhaps, be noted that the commutating pulse is wide enough to span the entire width of any possible data input pulse. Thus, the charge accumulated on capacitor 67 will be proportional to the width of the input pulse, and consequently is proportional to the total amount of energy of the received bit. After the data information has been entered into each of the six storage units, a quench (or reset) pulse is supplied from the receiver 10 (FIG. 1) to the quench input lead 68, which is amplified by the quench amplifier 15′, a conventional transistorized amplifier. The output of the amplifier 15 is then supplied to all of the storage units simultaneously. Specifically, in the case of the storage unit at the top of the drawing, the quench input signal, which is positive in nature, is supplied to the anode of diode 70, causing said diode 70 to become conductive and providing a discharge path for the negative charge on the capacitor 67. It should be noted that in the absence of a quench pulse the anode of diode 70 is maintained at a —15 volts from battery 71 in the quench amplifier 15′. The presence of the quench pulse causes the transistor 58 to become conductive, thus raising the potential of the anode of diode 70 to near ground potential. The capacitor 67 discharges through the load resistor 72 to produce a pulse whose amplitude is proportional to the amount of charge on the capacitor 67 and whose duration is equal to the duration of the quench amplifier pulse. Such a pulse is represented specifically by the pulse 31′ of FIG. 2. Pulse 31′ of FIG. 2 is then supplied to the averager unit 16′ and also to the comparison units 12′.

In the averager unit the pulses from the six storage units appearing across the six resistors 73, 74, 75, 76, 77, and 78 are averaged with respect to magnitude to produce a pulse whose magnitude is equal to the average amplitude of said six pulses. This average amplitude pulse is then supplied to the inverter 18′ via lead 79, coupling capacitor 81, and isolating resistor 82. The inverter 18′ is comprised of an NPN type transistor 80, which normally is biased to cut-off by negative battery 83. Thus, the collector electrode of transistor 80 is normally near the potential of the positive collector battery source 84. However, upon receipt of a positive pulse from averager 16′ the transistor 8 becomes conductive so that the potential of the collector electrode decreases due to the current flow through the resistor 85 to produce an output pulse which is supplied to comparison units 12′ through coupling capacitor 86. It is to be noted that the resistors 87 and 88 form a voltage divider to provide biasing potential for the base of transistor 80. Resistor 89 functions as a voltage-dividing resistor in conjunction with resistor 85 to control the potential on the collector electrode of transistor 80. The particular value of resistors 87, 88, 89, and 85 are matters of design and are controlled by the specific desired magnitude of the output signal in response to a particular input signal. The inverted signal from inverter 18′ is supplied to the common terminal of the resistors 90, 91, 92, 93, 94, and 95 while the positive output pulses of the six storage units 11′ are individually supplied to the end terminals, respectively, of resistors 96, 97, 98, 99, 100, and 101. It can be seen from the drawing that the six resistors 90 through 95, and the six resistors 96 through 101, are divided into six pairs of two resistors each, each pair of resistors forming a voltage divider. Specifically, the resistors 96 and 90 form a voltage-divider with the output signal of the inverter supplied to one end thereof and the output signal from the storage unit supplied to the other terminal thereof. Thus, the output at the tap 102 of the voltage divider is equal to the difference between the amplitudes of the two applied signals and is represented specifically by the pulse 104 of FIG. 4. Each of these amplitude difference pulses in the six channels, which is created in the comparison units 12, is supplied to an individual one of the full-wave rectifiers which are shown in the block 13′. The schematic diagram of one of these full-wave rectifiers is shown in detail.

As discussed hereinbefore, the function of the full-wave rectifier is to cause all of the six pulses of FIG. 4 to become positive pulses instead of some of them being positive and others being negative. For example, if a positive pulse is applied to the full-wave rectifier the output of the collector of transistor 110 is a pulse with a positive polarity. The aforementioned occurs in the following manner. When the positive pulse is supplied from the point 102, the diode 111 blocks such positive pulse from the transistor 110. Such positive pulse is, however, supplied to the base of transistor 112 and causes said transistor 112 to become conductive since it is a NPN type transistor. The current flow through the transistor 112 can be traced from positive battery 113 across the collector-emitter electrodes of transistor 112 through current-limiting resistor 114 and through load resistor 115 to ground. The positive voltage created across the load resistor 115 causes the transistor 110 to become more conductive, raising the potential of the collector electrode of transistor 110 from its normal state. It might be noted that said normal state is defined as that condition when there is no pulse supplied from the point 102, that is, when the point 102 is at ground potential. Under such normal state condition the base of transistor 110 is biased by means of resistors 117 and 118 in conjunction with minus battery source 120 and positive battery source 113 to a value of about plus two-tenths of a volt, which is just in the linear operating range of the transistor 110. Thus, when the transistor 112 is caused to be conductive by the application of a positive pulse to the base electrode thereof, the potential across resistor 115 will become positive which will cause a collector current to flow in transistor 110, thus raising the potential of said collector in a positive direction.

On the other hand, if a negative pulse is supplied from point 102 of the comparison unit 12′, the transistor 112 will be cut off since it is as a NPN type transistor, whereas the transistor 110 will be made to be conductive, since it is a PNP type transistor. With the application of a negative pulse the diode 111 will offer very litttle impedance thereto. The increase in conductivity of the transistor 110 will increase its collector current and raise the potential of the collector thereof. Thus, either a positive or a negative pulse supplied to one of the full-wave rectifiers of rectifiers 13′ will increase the potential of the collector electrode of the transistor corresponding to transistor 110, which constitutes the output terminal of the rectifier. Further, since the transistor 110 is operating in the linear portion of its characteristic curve the output pulse will be proportional to the amplitude of the input pulse.

The output signals of the full-wave rectifiers are supplied to an amplitude-to-width converter 14′ through a coupling capacitor 122. Amplitude-to-width converters operate in the following manner. During the absence of a pulse supplied from rectifier 13′, the transistor 125 (again using the amplitude-to-width converter shown schematically as an example) is in a conductive state since its collector is connected directly to the —15 volt source 123 through resistor 126 and since the base is also negative with respect to the emitter, the base being connected to the negative battery source 123 through the resistor 124. The right-hand plate of the capacitor 122 will acquire a negative charge, just slightly below ground potential, due to the diode action between the emitter and the base of transistor 125. When a positive pulse is supplied from rectifier 13 to the capacitor 122 both plates of the capacitor will initially rise to the potential of the supplied pulse. Thus the right-hand plate of capacitor 122 will become positive with respect to the emitter of transistor 125, thus cutting off transistor 125. However, said right-hand plate of capacitor 122 will immediately begin to charge in a negative direction through a circuit including resistor 124 and negative battery source 123. When the right-hand plate of capacitor 122 charges to a value just below ground potential, transistor 125 will again become conductive. It can be seen that the length of time that the conductor 125 will remain in a non-conductive state is determined by the magnitude of the amplitude of the pulse supplied from the rectifier 13. This period of time is reflected as a negative pulse on the collector electrode of transistor 125. More specifically, during the times that the transistor 125 is conductive, the collector electrode thereof is just a little bit below ground potential. However, when the transistor 125 is cut off the collector electrode will be quite negative due to the high impedance of transistor 125. The negative swing of the collector electrode is clamped to a minus six volts due to the action of diode 131 and battery source 132. The capacitor 122 will then acquire a negative charge and the transistor 125 will again become conductive so that the potential of the collector electrode will again rise to near ground potential. Thus, the negative pulse appearing on the collector electrode of transistor 125 will have a width proportional to the amplitude of the signal supplied from rectifier 13. Such negative pulse is supplied to the base of transistor 128 (FIG. 11) through voltage-dividing resistor 129. The transistor 128 is part of one of the six "nor" gates contained within the dotted rectangle 17'. Also supplied to the base of transistor 128 is a signal from the output of the amplitude-to-width converter 21' (FIG. 10) which functions to produce a width pulse from the largest amplitude pulse of the six output pulses from the full-wave rectifiers 13'. The largest amplitude pulse is selected by means of the largest amplitude gate 19' (FIG. 10), which consists of six diodes, such as diode 130, each having its anode connected individually to the outputs of the six full-wave rectifiers, and its cathode connected in common to the base of transistor 131. The emitter of transistor 131 will follow the potential of the positive pulse supplied to the baes thereof, due to the action of the emitter resistor 132. The increase in the potential of the emitter of transistor 137 will initially cause both plates of capacitor 133 to rise in a positive direction, thus cutting off the normally conductive transistor 134. It should be noted that in normal operation, i.e., in the absence of a pulse from transistor 131, the upper plate of capacitor 133 is charged negatively from battery 135 through resistor 136 to a potential just slightly negative with respect to the emitter of transistor 134. Then, when the positive pulse is supplied to transistor 131, the potential of both plates of capacitor 133 rises, thus cutting off transistor 134. The upper plate of capacitor 133 will then begin to charge negatively through resistor 136 until it reaches a point just below the potential of the emitter 138, at which transistor 134 will become conductive, thus raising the potential of its collector electrode back to substantially ground potential which was the potential thereon before the application of a pulse from transistor 131.

During the time that transistor 138 is cut off the collector electrode thereof decreases towards the −15 volt potential of battery source 135. Due to the clamping action of diode 140 and −6 volt battery source 141, however, the potential of the collector electrode cannot decrease below a minus 6 volts. However, the width of the pulse appearing at the collector electrode of transistor 134 will be directly proportional to the amplitude of the pulse supplied from transistor 131, since the time required for the capacitor 133 to charge sufficiently negative to cause transistor 138 to become conductive again is proportional to the amplitude of the pulse supplied thereto from transistor 131.

Figure 9:
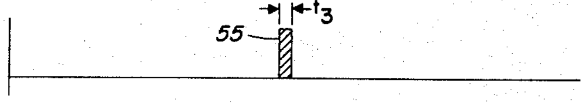

The negative pulse created on the collector of transistor 138 is supplied through resistor 142 to the base of transistor 143, which is normally nonconductive due to the positive battery source 144 connected to said base through resistor 145. The negative 6-volt pulse supplied to the base, however, will cause the transistor 143 to become conductive for the duration of such negative pulse and will produce at its collector electrode an inverted form of said pulse. More specifically, the pulse appearing at the collector electrode of transistor 143 is a positive pulse which, in the specific circuit shown in FIG. 9, has a peak amplitude of ground and a base of −6 volts due to the clamping action of diode 190 and negative six-volt battery source 184.

The aforementioned positive pulse generated at the collector electrode of the transistor 143 is supplied to the base of transistor 128 of the "nor" gate, block 17' (FIG. 11) through resistor 146. By definition, the "nor" gate will change state when only a negative pulse is supplied from the width converter 14'. When a negative pulse is supplied through resistor 129 from width converter 14' and a positive pulse is supplied simultaneously through resistor 146 from width converter 21', the "nor" gate will not change state. Its normal state is one of conductivity. To become non-conductive a negative pulse from the width converter through resistor 129 is required. The reception of a positive pulse through resistor 146 cancels the effect of the negative pulse through resistor 129, leaving the transistor 128 in a conductive state.

As discussed hereinbefore, the output pulse of converter 21' is caused to be just slightly less in width than the widest output pulse of the width converter 14'. Thus, only that "nor" gate of gates 17' appearing in the channel having the widest pulse of the six channels will pass an output pulse. The pulse from the width converter 20' will time-span all the other five pulses supplied to the remaining five "nor" gates 17'. In the specific example that has been used throughout, the widest pulse appears in channel 33'. Thus an output pulse, such as the pulse 55 of FIG. 9, appears only at the output of the "nor" gate 150 in the block 17'. The "nor" gate associated with channel 31', for example, could not assume a nonconductive condition since the pulse from width converter 21' would completely time-span the pulse from the width converter 14' associated with channel 31'. The only output signal from the "nor" gates 17', i.e., specifically from the "nor" gate 150, is then supplied to a "Nand" gate 38'. However, since the "Nand" gate of channel 31' is the only "Nand" gate shown in schematic form, such "Nand" gate will be described as if it had received the pulse from "nor" gate 17'.

In operation the "Nand" gate of gates 38' shown schematically requires the simultaneous application of two positive pulses upon the base 151 of transistor 152, one of these pulses coming from the "nor" gate 17' and the other pulse being supplied from the error detector means 25'. The resistors 153, 154, and 155, and the battery source 156 are designed so that the transistor 152 is, in the absence of the simultaneous application of the two above-mentioned pulses, is a nonconductive condition. Only upon the application of the two above-mentioned positive pulses does the transistor 152 become conductive. At such time a negative pulse will appear at the collector electrode thereof, which is equal in time width to the concurrent portions of the two pulses supplied to the base 151. The negative pulse from the transistor 152 will function to switch the toggle switch 157 from whatever state it is in to its opposite state. As discussed hereinbefore, the toggle switch, such as toggle switch 157, is constructed to store one of the six bits of the particular code being checked. If the toggle switch 157 contained a mark, the pulse from the transistor 151 would change it to a space. Conversely, if the toggle switch 157 contained a space the pulse from transistor 152 will cause the toggle switch to alter its state so as to register a mark.

The correct code is now stored in the toggle switch. Conventional circuitry means, not forming a part of this invention and consequently not being shown or described herein, is employed to then extract the corrected code from the storage toggle switches 23' of FIG. 11.

In one preferred embodiment of the invention the following circuit components and values may be employed. "Q" represents a transistor and "D" represents a diode.

| Resistor: | Value | Resistor: | Value |
|---|---|---|---|
| R62 | 6.8K | R88 | 18K |
| R63 | 6.8K | R89 ____ohms | 100 |
| R167 | 1.5K | R172 | 3.9K |
| R72–R78 | 1K | R117 | 39K |
| R90–R101 | 1K | R118 | 15K |
| R168 | 2.7K | R114 ____ohms | 220 |
| R169 | 22K | R115 ____ohms | 560 |
| R171 | 6.8K | R126 | 2.2K |
| R82 | 1.8K | R124 | 56K |
| R87 | 22K | R173 | 1.8K |
| R85 | 1K | R174 | 22K |

| Resistor: | Value | Resistor: | Value |
|---|---|---|---|
| R146 | 5.6K | R132 | 1K |
| R129 | 5.6K | R136 | 56K |
| R153 | 6.8K | R176 | 2.2K |
| R155 | 22K | R142 | 6.8K |
| R154 | 6.8K | R145 | 22K |
| R175 | 2.7K | R177 | 2.7K |

| Capacitor: | Value, μf. | Capacitor: | Value, μf. |
|---|---|---|---|
| C67 | .33 | C122 | 1 |
| C81 | 40 | C133 | 1 |
| C86 | 40 | | |

| Voltage source: | Value | Voltage source: | Value |
|---|---|---|---|
| E65 | +6 | E182 | −6 |
| E66 | −15 | E160 | +6 |
| E170 | +6 | E161 | −6 |
| E120 | −15 | E162 | −15 |
| E113 | +6 | E135 | −15 |
| E84 | +6 | E141 | −6 |
| E83 | −15 | E183 | −15 |
| E180 | −6 | E184 | −6 |
| E123 | −15 | E144 | +6 |
| E71 | −15 | E200 | −15 |

| Component: | Type | Component: | Type |
|---|---|---|---|
| Q64 | 2N404 | Q80 | 2N388 |
| Q110 | 2N404 | Q131 | 2N388 |
| Q112 | 2N388 | Q134 | 2N404 |
| Q125 | 2N404 | Q143 | 2N404 |
| Q128 | 2N388 | D186 | IN645 |
| Q185 | 2N404 | D70 | IN645 |

It is to be noted that the form of the invention shown and described herein is but the preferred embodiment thereof and that various changes may be made in circuit design and circuit parameters without departing from the spirit or the scope of the invention.

I claim:

1. Means for detecting and correcting an error in a code character having N bits of information comprising pulse producing means having N data input terminals and N channels, one data input terminal and one channel for each bit, and an output terminal for each channel, means for supplying each of said N bit code characters to said N data input terminals, one bit to each data input terminal in a predetermined order, said pulse producing means constructed to produce a pulse on that particular output terminal of the corresponding channel to which was supplied the input bit whose total energy content varied the greatest amount from the average energy content of said N bits, storage means having N storage elements, one element for each of the received bits, and means including error detection means responsive to the output pulse of said pulse producing means to supply a pulse to the individual storage element of the corresponding channel when the presence of an error is detected, said storage elements each being constructed to change the nature of the bit stored therein in response to a pulse supplied thereto.

2. Means for detecting and correcting an error in a received code character comprised of N bits of information, comprising a separate channel for each bit, pulse-forming means having N output terminals, one for each of the N bits received, said pulse-forming means constructed to be responsive to each received code character to produce on each of said output terminals a pulse of a given polarity whose amplitude is proportional to the difference between the energy of the bit received in the corresponding channel and the average energy of said N received bits, pulse producing means having N channels and constructed to be responsive to the output pulses of said pulse-forming means to produce a pulse only in that channel in which appears the pulse derived from the received bit whose energy varies most from said average energy of the received bits, storage means having N storage elements, one element for each of the received N bits, and means including error detection means for supplying the output pulse of said pulse producing means to the corresponding individual storage element when the presence of an error is indicated, said storage elements each constructed to change the nature of the bit stored therein in response to a pulse supplied thereto.

3. Error detecting and correcting means in accordance with claim 2 in which said pulse-forming means comprises comparison means having N channels, means for supplying in parallel to the channels of said comparison means said N bits of information, each being in a pulse form, the amplitude of each of said pulses being proportional to the amount of energy contained in each received bit, amplitude averaging means responsive to the N pulses supplied to said comparison means to produce an average amplitude pulse whose amplitude is equal to the average amplitude of said N pulses, said comparison means constructed to respond to said N pulses and said average amplitude pulse to produce second N output pulses in parallel, each of said second N pulses having an amplitude and polarity substantially equal to the algebraic difference between the amplitude of the pulse supplied to the corresponding channel of said comparison means and the amplitude of said average amplitude pulse, N channels of full wave rectification means constructed to respond to the second N output pulses of said comparison means to produce third N output pulses of the same polarity in parallel, each of said third N output pulses having an amplitude proportional to the amplitude of the pulse supplied to the corresponding channel of the full wave rectification means.

4. Error detecting and correcting means in accordance with claim 2 in which said pulse producing means comprises N channels of amplitude-to-width converter means individually responsive to the N output pulses of said pulse-forming means to produce second N output pulses, the width of each pulse varying in proportion to the amplitude of the pulse supplied to the corresponding channel, means for selecting the pulse having the largest amplitude from the N output pulses of said pulse-forming means, second amplitude-to-width converter means for producing a pulse whose width is proportional to the amplitude of said largest amplitude pulse but slightly less than the width of the widest pulse produced by the first amplitude-to-width converter means, N channels of gating means each constructed to pass only that portion of the pulse from said first amplitude-to-width converter which does not coincide with the pulse from said second amplitude-to-width converter.

5. Means for detecting and correcting an error in a code character having N bits of information comprising comparison means having N channels, means for supplying in parallel to said comparison means said N bits each in a pulse form, each particular bit appearing in a particular channel, the amplitude of each of said pulses being proportional to the amount of energy contained in each received bit, amplitude averaging means responsive to said N bits supplied to said comparison means to produce an average amplitude pulse whose amplitude is equal to the average amplitude of said N bits, said comparison means constructed to respond to said N bits and said average amplitude pulse to produce second N output pulses in parallel, each of said last-mentioned N pulses having an amplitude substantially equal to the algebraic difference between the amplitude of the bit supplied to said comparison means in the corresponding channel and the amplitude of the said average amplitude pulse, N channels of full wave rectification means constructed to respond to the N output pulses of said comparison means to produce third N output pulses of the same polarity in parallel, with each pulse having an amplitude proportional to the amplitude of the pulse applied to the comparison means in the same channel, N channels of amplitude-to-width converters individually responsive to the N output pulses of said rectification means to produce fourth N pulses, the width of each pulse varying in proportion to the amplitude of the applied pulse, means for selecting the pulse having the largest amplitude from said fourth N output pulses of said rectification means, second amplitude-to-width converter means for producing a pulse whose width is proportional to the amplitude of said largest amplitude pulse but slightly less than the width of the widest pulse produced by the first amplitude-to-width converter means, N channels of first gating means each constructed to pass only that portion of the pulse from said first amplitude-to-width converter which does not coincide with the pulse from said second amplitude-to-width converter, error detecting means for detecting the presence of an error in the received code character, storage means having N channels of switches for storing the N bits of each received code character, N channels of second gating means all responsive to an output signal from said error detecting means to pass any output signal from said first gating means to the corresponding channel of said storage means to change the nature of the data bit stored therein.

References Cited by the Examiner

UNITED STATES PATENTS 2,783,453 2/57 Rose ---------------- 178—23

MALCOLM A. MORRISON, *Primary Examiner.*

DARYL W. COOK, *Examiner.*